T. BIRD, DEC'D.
H. M. BIRD, ADMINISTRATRIX.
FISHING LINE.
APPLICATION FILED OCT. 3, 1919.

1,371,067.

Patented Mar. 8, 1921.

WITNESSES

INVENTOR
THOMAS BIRD,
BY
ATTORNEYS

UNITED STATES PATENT OFFICE.

THOMAS BIRD, OF CORTLAND, NEW YORK; HANNA M. BIRD ADMINISTRATRIX OF SAID THOMAS BIRD, DECEASED.

FISHING-LINE.

1,371,067.  Specification of Letters Patent.  Patented Mar. 8, 1921.

Application filed October 3, 1919. Serial No. 328,261.

*To all whom it may concern:*

Be it known that I, THOMAS BIRD, a citizen of the United States, and a resident of Cortland, in the county of Cortland and State of New York, have invented a new and Improved Fishing-Line, of which the following is a full, clear, and exact description.

This invention relates to new and useful improvements in fishing lines, and it pertains more particularly to lines of the waterproof enamel type especially used for fly-casting.

Lines of this type as ordinarily constructed are made from braided silk, and after said line is finished, it is subjected to a suitable process for applying thereto a coating of enamel which adds weight and rigidity to the line.

It has been found that when the enamel on lines so constructed creases or breaks, the line absorbs moisture which causes the same to swell, and also sets up a process of deterioration owing to the fact that a waterproof coating on the line prevents a proper drying thereof and holds the moisture within the line.

Furthermore, in lines of this character, it is impossible to thoroughly penetrate the braided structure of the line, nor is it possible to fill all of the interstices present in the braided structure.

It is the primary object of the present invention to form a line which may be completely water-proofed.

It is a further object of the invention to provide a fishing line of greater strength than the ordinary braided type.

With the above and other objects in view, reference is had to the accompanying drawings, in which—

Figure 1:
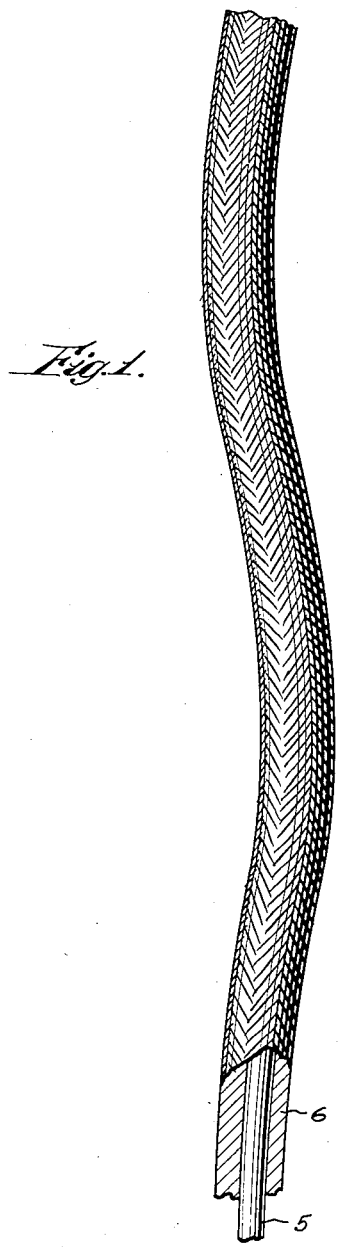
Figure 2:

Figure 1 is a view in elevation, giving a diagrammatic showing of a portion of a fishing line constructed in accordance with the present invention, and Fig. 2 is a transverse sectional view thereof.

Referring more particularly to the drawings, the present invention comprises a core 5 and a covering or sheathing 6. The core 5 is formed of a plurality of separate silk strands 7, which are twisted together to form a single strand. After these strands 7 have been twisted together to form the single strand or core 5, the latter is subjected to a suitable water-proofing process, which consists in a treatment of the core by means of which it is thoroughly saturated with a suitable water-proof solution, enamel, or the like.

After the core 5 has been so formed and treated, the casing or sheathing 6 of the line is hard braided thereabout. By hard braiding the casing or sheathing 6, the water is prevented from entering to the core 5, and by inclosing the core 5 in a sheathing, such as 6, the enamel portion of the line is prevented from kinking, thereby eliminating the possibility of cracking the enamel of the core to admit water or moisture should it come in contact with said core.

From the foregoing description, it will be seen that the present invention provides a fishing line, which has all of the virtues of the ordinary braided line, the core lending sufficient rigidity to the structure to facilitate fly-casting, and, at the same time, the enamel portion of the line is adequately protected from moisture.

I claim—

1. A fishing line comprising a core consisting of a plurality of twisted silken strands, said core water-proofed and enameled, and an independent covering for said core, said covering comprising a watertight braided structure.

2. A fishing line comprising a twisted core of fibrous strands and a hard braided covering for said core, said core being waterproofed to provide an enameled coating therefor prior to the application of the braided covering, said enamel coating being independent of the braided covering.

3. As a new manufacture a fishing line consisting of a core of twisted sericeous strands said core water-proofed and enameled, and a watertight sheathing for said enameled core, said sheathing consisting of sericeous strands hard braided upon the enameled core, but unconnected therewith.

THOMAS BIRD.